(12) United States Patent
Shi et al.

(10) Patent No.: US 11,937,110 B2
(45) Date of Patent: Mar. 19, 2024

(54) SIGNAL REPORTING METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Zhihua Shi, Guangdong (CN); Wenhong Chen, Guangdong (CN); Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 506 days.

(21) Appl. No.: 17/160,583

(22) Filed: Jan. 28, 2021

(65) Prior Publication Data

US 2021/0153059 A1 May 20, 2021

Related U.S. Application Data

(63) Continuation of application No. PCT/CN2018/099702, filed on Aug. 9, 2018.

(51) Int. Cl.
*H04W 24/10* (2009.01)
(52) U.S. Cl.
CPC ................... *H04W 24/10* (2013.01)
(58) Field of Classification Search
None
See application file for complete search history.

(56) References Cited

U.S. PATENT DOCUMENTS

| 2013/0208601 | A1* | 8/2013 | Cui | ........................ | H04W 24/10 |
| | | | | | 370/252 |
| 2018/0255473 | A1* | 9/2018 | Kim | ...................... | H04W 24/10 |
| 2019/0230536 | A1* | 7/2019 | Da Silva | ............... | H04L 1/0027 |
| 2020/0014428 | A1* | 1/2020 | Chen | ....................... | H04B 7/024 |
| 2020/0120523 | A1* | 4/2020 | Ramachandra | ....... | H04W 24/10 |

(Continued)

FOREIGN PATENT DOCUMENTS

| CN | 106686618 A | 5/2017 |
| CN | 108282212 A | 7/2018 |
| WO | 2017136666 A1 | 8/2017 |

OTHER PUBLICATIONS

Ericsson, Miscellaneous EN-DC correction, R2-1806391, 3GPP TSG-WG2 Meeting #102, Busan, South Korea, May 21-25, 2018 (Year: 2021).*

(Continued)

*Primary Examiner* — Benjamin Lamont
(74) *Attorney, Agent, or Firm* — PERKINS COIE LLP

(57) ABSTRACT

A signal reporting method, a terminal device and a network device for performing signal selection according to the report amount other than layer 1 reference signal receiving power (L1-RSRP), which can improve the quality of the selected signal, so as to improve system performance. The method comprises: the terminal device determines a target report amount in at least one report amount, wherein the at least one report amount is configured by means of measurement configuration information, and the at least one report amount comprises report amounts other than L1-RSRP; the terminal device determines the reported signal according to the measurement result of the target report amount for N signals.

11 Claims, 3 Drawing Sheets

300

A network device sends measurement configuration information to a terminal device, wherein the measurement configuration information is used for configuring the terminal device to report related information of N signals based on at least one report amount, wherein the at least one report amount includes other report amounts other than the Layer1-Reference Signal Receiving Power (L1-RSRP), wherein N is a positive integer; — S310

The network device receives a report result sent from the terminal device, wherein the report result includes information of a signal determined by the terminal device according to the measurement results of the at least one report amount for N signals — S320

(56) References Cited

U.S. PATENT DOCUMENTS

2021/0092625 A1* 3/2021 Wang .................... H04L 5/0057
2021/0306060 A1* 9/2021 Matsumura .......... H04B 17/336

OTHER PUBLICATIONS

EPO, Extended European Search Report for European Application No. 18929632.0. dated Jul. 6, 2021. 9 pages.
Ericsson "Beam sorting order for measurement reporting" R2-1801314; 3GPP TSG-AN WG2 AH-1801; Vancouver, Canada; Jan. 22-26, 2018. 2 pages.
Ericsson "Draft Update to Flag for Beam ID reporting (Issue S005)" Tdoc Draft R2-1801646; 3GPP TSG-RAN WG2 NR AH#3; Vancouver, Canada; Jan. 22-26, 2018. 3 pages.
Ericsson "Explicit indication for only beam ID reporting" Tdoc R2-1714150; 3GPP TSG-RAN WG2 #100; Reno, Nevada, USA, Nov. 27-Dec. 1, 2017. 5 pages.
Office Action for Taiwanese Application No. 108128388 dated Sep. 26, 2022. 12 pages with English translation.
Request for the Submission of an Opinion for Korean Application No. 10-2021-7006179 dated Feb. 16, 2023. 12 pages with English translation.
Interdigit Al. Inc. "Remaining Issues on Beam Management"— 3GPP TSG RAN WGJ Meeting #91, RI-1720630, Dec. 1, 2017 (Dec. 1, 2017), parts 1-2 (13 pages).
International Search Report dated May 9, 2019 of PCT/CN2018/099702 (4 pages).
Final Examination Report for Australian Application No. 2018436197 dated Dec. 19, 2023, 3 pages.

\* cited by examiner

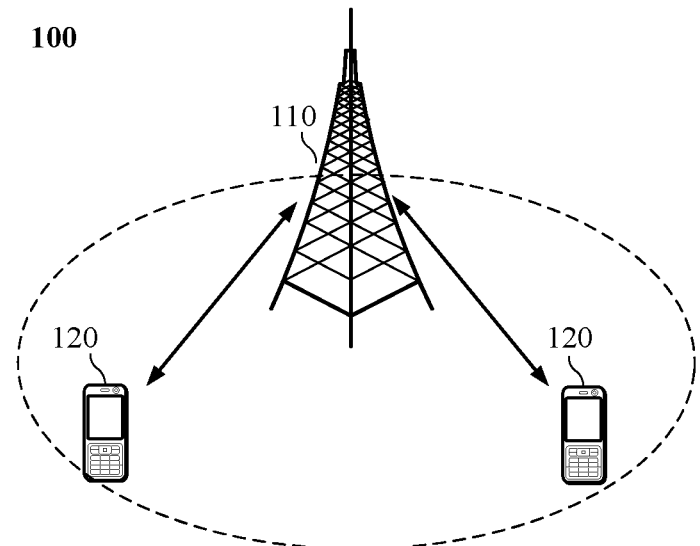

A terminal device determines a target report amount in at least one report amount, wherein the at least one report amount is configured by a network device through measurement configuration information, and the at least one report amount includes other report amounts other than Layer1-Reference Signal Receiving Power (L1-RSRP) — S210

The terminal device determines signals to be reported according to measurement results of the target report amounts for N signals — S220

A network device sends measurement configuration information to a terminal device, wherein the measurement configuration information is used for configuring the terminal device to report related information of N signals based on at least one report amount, wherein the at least one report amount includes other report amounts other than the Layer1-Reference Signal Receiving Power (L1-RSRP), wherein N is a positive integer; ⟵S310

The network device receives a report result sent from the terminal device, wherein the report result includes information of a signal determined by the terminal device according to the measurement results of the at least one report amount for N signals ⟵S320

FIG. 3

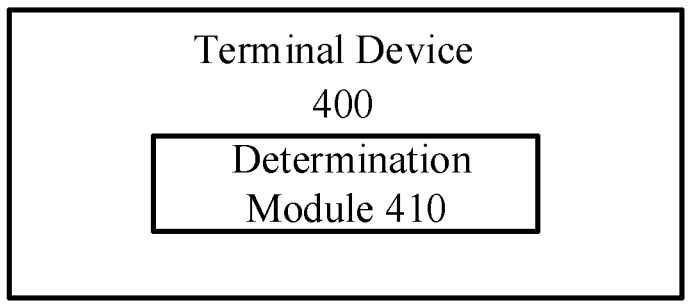

FIG. 4

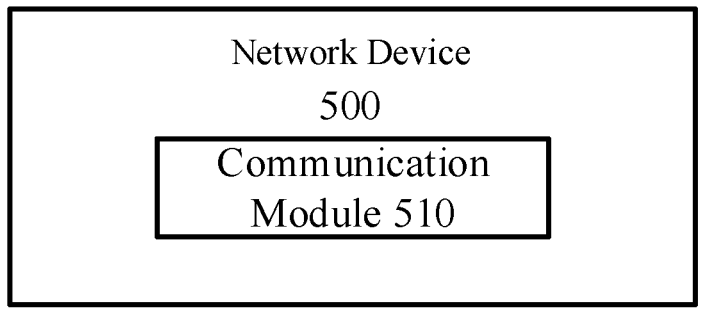

FIG. 5

SIGNAL REPORTING METHOD, TERMINAL DEVICE AND NETWORK DEVICE

CROSS-REFERENCE TO RELATED APPLICATION

This application is a continuation application of International Application No. PCT/CN2018/099702, filed on Aug. 9, 2018, the entire disclosure of which is hereby incorporated by reference.

TECHNICAL FIELD

The implementations of the present application relates to the field of communication, in particular to a signal reporting method, terminal device and network device.

BACKGROUND

In a 5G multi-beam system, a terminal device can measure the Layer1-Reference Signal Receiving Power (L1-RSRP) of multiple signals, and determine which beams have better transmission qualities based on measurement results, or beams that transmit these signals with better transmission qualities, such that the terminal device can report the information of these signals, such as beam information, measurement results or the like, to the network device.

However, the measurement mode based on L1-RSRP is too simple, and in some cases, the signal quality determined based on the measurement results of L1-RSRP is not necessarily optimal. In this case, how to measure signals to determine a signal to be reported is a problem to be solved urgently.

SUMMARY

Implementations of the present application provide a signal reporting method, a terminal device and a network device. The network device can configure at least one report quantity for the terminal device, and the terminal device can determine, based on a measurement result of the at least one report quantity, a signal to be reported, which can improve the flexibility of signal measurement, and facilitate selecting a signal with a better quality and reliability so as to improve the system performance.

In a first aspect, there is provided a signal reporting method, including: a terminal device determines a target report quantity in at least one report quantity, wherein the at least one report quantity is configured by the network device through measurement configuration information, and the at least one report quantity includes other report quantities other than Layer1-Reference Signal Receiving Power (L1-RSRP); and the terminal device determines signals to be reported according to measurement results of the target report quantities for N signals.

In a second aspect, there is provided a signal reporting method, including: a network device sends measurement configuration information to a terminal device, wherein the measurement configuration information is used for configuring the terminal device to report related information of N signals based on at least one report quantity, where N is a positive integer; and the network device receives a report result sent from the terminal device, wherein the report result includes information of a signal determined by the terminal device according to a measurement result of the at least one report quantity for the N signals.

In a third aspect, there is provided a terminal device, which is used for executing the method in the above first aspect or in any possible implementation of the first aspect. Specifically, the terminal device includes units for executing the method in the above first aspect or in any possible implementation of the first aspect.

In a fourth aspect, there is provided a network device, which is used for executing the method in the above second aspect or in any possible implementation of the second aspect. Specifically, the terminal device includes units for executing the method in the above second aspect or in any possible implementation of the second aspect.

In a fifth aspect, there is provided a terminal device, which includes a processor and a memory. The memory is used for storing a computer program, and the processor is used for calling and running the computer program stored in the memory to execute the method in the above first aspect or in any of the various implementations of the first aspect.

In a sixth aspect, there is provided a network device, which includes a processor and a memory. The memory is used for storing a computer program, and the processor is used for calling and running the computer program stored in the memory to execute the method in the above second aspect or in any of the various implementations of the second aspect.

In a seventh aspect, there is provided a chip, which is used for implementing any one of the above first to second aspects or in any one of the various implementations of the above first to second aspects.

Specifically, the chip includes a processor used for calling and running a computer program from a memory, so that a device equipped with the chip executes the method in any one of the above first to second aspects or in any of the various implementations of the above first to second aspects.

In an eighth aspect, there is provided a computer-readable storage medium used for storing a computer program that enables a computer to execute the method in any one of the above first to second aspects or in any of the various implementations of the above first to second aspects.

In a ninth aspect, there is provided a computer program product including computer program instructions that enable a computer to execute the method in any one of the above first to second aspects or in any of the various implementations of the above first to second aspects.

In a tenth aspect, there is provided a computer program which, when run on a computer, enables the computer to execute the method in any one of the above first to second aspects or in any of the various implementations of the above first to second aspects.

Based on the above technical solution, the network device can configure at least one report quantity for the terminal device, the terminal device determines the target report quantity in the at least one report quantity, and further can perform a selection on the N signals according to the measurement results of the target report quantities, which is conducive to improving the flexibility of signal measurement. In addition, the selection of signals based on the measurement results of the at least one report quantity is conducive to selecting signals with better qualities and reliabilities, thereby improving the system performance.

BRIEF DESCRIPTION OF DRAWINGS

FIG. 1 is a schematic diagram of an architecture of a communication system provided by an implementation of the present application.

FIG. 2 is a schematic flowchart of a signal reporting method provided by an implementation of the present application.

FIG. 3 is a schematic diagram of a signal reporting method provided by another implementation of the present application.

FIG. 4 is a schematic block diagram of a terminal device provided by an implementation of the present application.

FIG. 5 is a schematic block diagram of a network device provided by an implementation of the present application.

DETAILED DESCRIPTION

Figure 6:
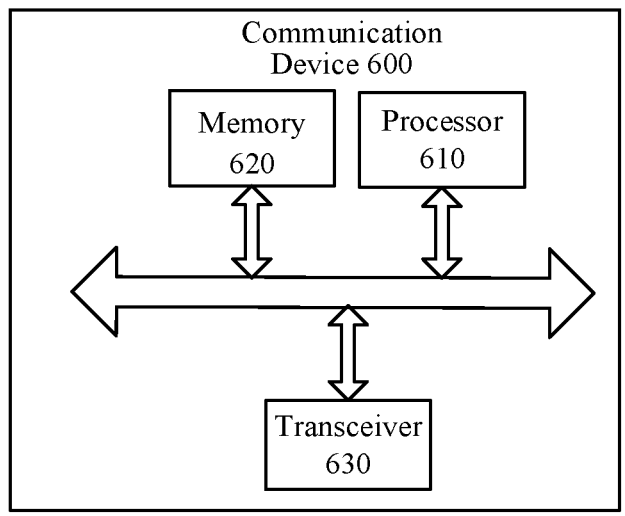
FIG. 6 is a schematic block diagram of a communication device provided by an implementation of the present application.

The technical solution in implementations of the present application will be described below with reference to the drawings in implementations of the present application. It is apparent that the implementations described are just some implementations of the present application, but not all implementations of the present application. Based on the implementations of the present application, all other implementations achieved by a person of ordinary skill in the art without paying an inventive effort are within the protection scope of the present application.

The technical solutions of the implementations of the present application may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, a 5G system or the like.

Illustratively, a communication system 100 applied in an implementation of the present application is as shown in FIG. 1. The communication system 100 may include a network device 110, wherein the network device 110 may be a device that communicates with a terminal device 120 (or referred to as a communication terminal, or a terminal). The network device 110 may provide communication coverage for a specific geographical area, and may communicate with terminal devices located within the coverage area. Optionally, the network device 110 may be a Base Transceiver Station (BTS) in a GSM system or CDMA system, a NodeB (NB) in a WCDMA system, an Evolutional Node B (eNB or eNodeB) in a LTE system, or a radio controller in a Cloud Radio Access Network (CRAN), or the network device may be a network side device in a mobile switch center, a relay station, an access point, a vehicle-mounted device, a wearable device, a hub, a switch, a bridge, a router, or a 5G network, or a network device in a future evolved Public Land Mobile Network (PLMN), etc.

The communication system 100 also includes at least one terminal device 120 located within the coverage range of the network device 110. As used herein, the term "terminal device" includes, but is not limited to, a device configured to connect via a wired circuit, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a Digital Video Broadcasting-Handheld (DVB-H) network, a satellite network, and an AM-FM broadcast transmitter; and/or an apparatus, of another communication terminal, configured to receive/send a communication signal; and/or an Internet of Things (IoT) device. A terminal device configured to communicate via a wireless interface may be referred to as a "wireless communication terminal", a "wireless terminal" or a "mobile terminal". Examples of the mobile terminal include, but is not limited to, a satellite or cellular telephone, a Personal Communication System (PCS) terminal capable of combining with a cellular wireless telephone and data processing, faxing, and data communication abilities, a Personal Digital Assistant (PDA) that may include a radio telephone, a pager, an internet/intranet access, a Web browser, a memo pad, a calendar, and/or a Global Positioning System (GPS) receiver, and a conventional laptop and/or palmtop receiver or another electronic apparatus including a radio telephone transceiver. The terminal device may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved Public Land Mobile Network (PLMN), or the like.

Optionally, terminal direct connection (Device to Device, D2D) communication may be performed between the terminal devices 120.

Optionally, the 5G system or 5G network may be referred to as a New Radio (NR) system or a NR network.

FIG. 1 shows one network device and two terminal devices as an example. Optionally, the communication system 100 may include multiple network devices, and other quantity of terminal devices may be included within the coverage range of each network device, and this is not limited in the implementations of the present application.

Optionally, the communication system 100 may include other network entities such as a network controller, a mobile management entity and the like, implementations of the present application are not limited thereto.

It should be understood that, a device with a communication function in a network/system in an implementation of the present application may be referred to as a communication device. The communication system 100 shown in FIG. 1 is taken as an example, the terminal device may include a network device 110 and a terminal device 120 which have communication functions, and the network device 110 and the terminal device 120 may be the specific devices described above, which will not be repeatedly described here again. The terminal device may also include other devices in the communication system 100, such as a network controller, a mobile management entity, and other network entities, and the implementations of the present application are not limited thereto.

It should be understood that the terms "system" and "network" are often used interchangeably in this document. The term "and/or" in this document is merely an association relationship describing associated objects, indicating that there may be three relationships, for example, A and/or B may indicate three cases: A alone, A and B, and B alone. In addition, the symbol "l" in this document generally indicates that objects before and after the symbol "l" have an "or" relationship.

Hereinafter, a signal reporting method according to an implementation of the present application will be described with reference to FIG. 2 to FIG. 3. It should be understood that FIG. 2 to FIG. 3 show main acts or operations of the signal reporting method of the implementation of the present application, but these acts or operations are only examples, and other operations or variations of the various operations of FIG. 2 to FIG. 3 may also be executed in the implementation of the present application. In addition, each act in a method implementation of the present application may also be executed in a different order as described in the method implementation, and it is possible that not all operations in the method implementation are required to be executed.

FIG. 2 is a schematic flowchart of a signal reporting method provided by an implementation of the present application. As shown in FIG. 2, the method 200 includes following contents: S210 and S220.

S210, a terminal device determines a target report quantity in at least one report quantity, wherein the at least one report quantity is configured by a network device through measurement configuration information, and the at least one report quantity includes other report quantities other than Layer1-Reference Signal Receiving Power (L1-RSRP); and S220, the terminal device determines signals to be reported according to measurement results of the target report quantities for N signals.

Optionally, in an implementation of the present application, the N signals may include a Channel State Information Reference Signal (CSI-RS), or may also include all or part of signals in a Synchronization Signal Block (SSB), for example, they may include only a Secondary Synchronization Signal (SSS), or may include SSS and Physical Broadcast Channel (PBCH), or may include SSS and a Demodulation Reference Signal (DMRS), etc., or may include other downlink reference signals as well, which are not specifically limited in the implementation of the present application.

In an implementation of the present application, the network device may inform the terminal device of a measurement related configuration, i.e., measurement configuration information, in which at least one report quantity (reporting quality) is indicated, and the at least one report quantity may include at least one of a Layer1-Reference Signal Receiving Power (L1-RSRP), a Layer1-Signal to Interference plus Noise Ratio (L1-SINR) and a Layer1-Reference Signal Receiving Quality (L1-RSRQ), or the at least one report quantity may include other information used for characterizing a signal quality, such as a Received signal Strength Indication (RSSI), etc., and the implementations of the present application are not limited thereto.

It should be understood that, in an implementation of the present application, the terminal device may measure signals before S210, for example, the terminal device may measure at least one report quantity for the N signals, and further, in S220, the terminal device may select a signal based on a measurement result of the target report quantity; or the terminal device may measure signals after S210, for example, the terminal device may measure the target report quantities for the N signals after determining the target report quantity in the at least one report quantity, and further in S220, the selection of signals is performed based on the measurement results of the target report quantities, which is not limited in the implementations of the present application.

Specifically, the terminal device selects K signal(s) with optimal quality based on the measurement results of the target report quantities for the N signals, where K is a positive integer less than or equal to N. Further, information of the K signals, such as the measurement results of the target report quantities for the K signals and/or identification information of the K signals, may be reported to the network device. In a specific implementation, if the K signals are CSI-RS, the identification information of the K signals may be information of CSI-RS resource index (CSI-RS resource index); or if the K signals are SSB signals, the identification information of the K signals may be information of SSB index (SSB index).

That is to say, the target report quantity may only include a measurement result about L1-RSRP, L1-SINR or L1-RSRQ, or may also include the information of a signal to be reported, for example, information related to reference signal resource identifiers (such as CSI-RS resource index or SSB index).

Optionally, in an implementation of the application, the terminal device may only report the information of the target report quantity to the network device, or may also report the information of other report quantities to the network device at the same time. For example, if the target report quantity includes a measurement result of L1-SINR, the terminal device may also report to the network device the measurement results of L1-RSRQ or the measurement results of L1-RSRP for the K signals and the like.

For convenience of description and explanation, descriptions will be made with the report quantity being L1-RSRP, L1-SINR or L1-RSRQ, and other information that may be included in the report quantity, such as the description of information of the signal to be reported, which is omitted, but this does not mean that such information is not included in the report quantity.

Hereinafter, the signal reporting method of an implementation of the present application will be described in detail with reference to specific implementations.

Implementation 1: The at least one report quantity only includes a first report quantity, that is, the network device is configured to independently measure the first report quantity.

Optionally, the first report quantity may be L1-RSRP, L1-SINR, or L1-RSRQ, or may be other signal quality information, which is not limited in the implementations of the present application.

The first report quantity may be configured through first measurement configuration information, that is, the network device may configure only one report quantity by the first measurement configuration information, and the terminal device may select K signals to report according to the measurement results of the one report quantity for N signals, for example, to report measurement results of the first report quantities for the K signals.

Optionally, the network device may also configure a second report quantity through second measurement configuration information, and the terminal device may select and report signals according to the measurement results of the second report quantities for the N signals.

That is to say, the network device may configure a corresponding report quantity through independent measurement configuration information, and the terminal device may perform independent measurement, signal selection and reporting according to different pieces of measurement configuration information. That is, each piece of measurement configuration information corresponds to independent actions of signal measurement, signal selection and reporting.

For example, if the first report quantity configured by the first measurement configuration information is L1-SINR and the first report quantity configured by the second measurement configuration information is L1-SEQ, the terminal device may select K1 signals according to the measurement results of L1-SINR for these N signals, report to the network device measurement results of L1-SINR for these K1 signals, and select K2 signals according to the measurement results of L1-RSRQ for these N signals, and report to the network device measurement results of L1-RSRQ for these K2 signals, where K1 and K2 are positive integers, and the K1 and K2 may be the same or different.

To sum up, when the at least one report quantity only includes one report quantity, the terminal device may determine the one report quantity as the target report quantity, and further, determine K signals with optimal quality from the N signals according to the measurement results of the target report quantities, and report to the network device the measurement results of the target report quantities for the K signals. Here, the measurement results of the target report quantities may be measurement results of L1-RSRP, L1-SINR or L1-RSRQ, or may be difference between the measurement results of L1-RSRP, L1-SINR or L1-RSRQ (for example, a difference relative to a specific measurement result or a difference between measurement results, etc.), or may be quantized values of the measurement results of L1-RSRP, L1-SINR or L1-RSRQ, etc. Forms of reporting the measurement results are not limited in the implementations of the present application.

Optionally, in some implementations, when the network device configures only one report quantity, the terminal device may select signals only according to measurement results of the one report quantity, or may select other report quantities to assist in the selection of signals. For example, if the report quantity configured by the network device is the L1-SINR, the terminal device may autonomously select to measure the L1-RSRQ to assist in the selection of signals through measurement results of the L1-RSRQ.

That is to say, if the report quantity configured by the network device is the first report quantity, the terminal device may choose to measure second report quantities for the N signals, and then select signals according to the measurement results of the first report quantities for the N signals combined with measurement results of the second report quantities for the N signals, which is conducive to improving the quality and reliability of the selected signals and improve the system performance.

Optionally, in some implementations, when configuring a measurement, the network device may include first indication information in the measurement configuration information to indicate whether the terminal device is allowed to autonomously select other report quantities to assist in the selection of signals. In this case, the terminal device may use other report quantities to assist in the selection of signals if the first indication information indicates that the terminal device is allowed to do so.

Optionally, in some implementations, the measurement configuration information further includes second indication information, wherein the second indication information is used for indicating whether the measurement results of the second report quantities need to be reported.

Specifically, when reporting signals, the terminal device may only report the measurement results of the target report quantities, or may report the measurement results of the target report quantities and the measurement results of other report quantities assisting in the selection of signals, or may determine to report measurement results of which report quantities according to the second indication information.

Implementation 2: The at least one report quantity includes at least two report quantities, taking a first report quantity and a second report quantity as an example.

In implementation 2-1, the terminal device autonomously selects one of the first report quantity and the second report quantity for measurement, and selects K signals from N signals according to the measurement results of the one report quantity, and further reports signals. For a specific implementation thereof, reference may be made to the previous implementations, which will not repeat them here.

In this case, since the network device does not know the measurement results of which report quantity are reported by the terminal device, therefore the terminal device is required to inform the network device of which report quantity the measurement results correspond to.

In the following implementations 2-2 to 2-4, the terminal device may select and report signals according to a preferred report quantity and an auxiliary report quantity. It should be understood that the preferred report quantity and the auxiliary report quantity may be indicated by the network device, or preset on the terminal device, or selected by the terminal device. For example, the preferred report quantity may be the L1-RSRP, and the auxiliary report quantity may be other report quantities other than the L1-RSRP, such as the L1-SINR or the L1-RSRQ, or vice versa.

Optionally, in some implementations, the terminal device may also determine which of the first report quantity and the second report quantity is the preferred report quantity and which is the auxiliary report quantity according to positions of the report quantities in the measurement configuration information, for example, it may be determined that the former report quantity in the measurement configuration information is the preferred report quantity or the latter report quantity is the preferred report quantity.

Optionally, the terminal device may also determine the preferred report quantity and the auxiliary report quantity according to types of the first report quantity and the second report quantity. For example, the L1-RSRP is a first type and other report quantities are a second type, and it may be determined that a report quantity of the first type is the preferred report quantity or a report quantity of the second type is the preferred report quantity.

In implementation 2-2, the terminal device selects signals according to the measurement results of the preferred report quantity, and when the measurement results of two preferred report quantities are the same, which signal has a better quality is determined according to the measurement result of the auxiliary report quantity.

For example, if the first report quantity is the L1-RSRP and the second report quantity is the L1-SINR, in one implementation mode, the first report quantity may be the preferred report quantity and the second report quantity is the auxiliary report quantity. In this case, the selection of signals may be performed preferentially according to measurement results of L1-RSRPs, and when the measurement results of the two L1-RSRPs are the same, the selection is further assisted by the measurement results of L1-SINR to determine which one of the signals corresponding to the measurement results of the two L1-RSRPs has a better quality.

For example, if measurement result 2 of the L1-RSRP of signal 1 and measurement result 2 of the L1-RSRP of signal 2 are equal, in this case, by comparing the measurement result 1 of the L1-SINR of signal 1 with the measurement result 2 of the L1-SINR of signal 2, it is determined that the signal quality of signal 1 is better than that of signal 2, and it can be further determined that signal 1 is the signal required to be reported.

In implementation 2-3, the network device selects M signals according to measurement results of the preferred report quantities, and further selects K signals from the M signals according to the measurement results of the auxiliary report quantities for the M signals, where M is greater than or equal to K.

Optionally, M may be configured by the network device or determined by the terminal device according to K, for example, M=K+5, which is not limited by the implementation of the present application.

In implementation 2-4, when the measurement results of the preferred report quantities meet a certain condition, the terminal device determines K signals from the N signals according to the measurement results of the auxiliary report quantities.

By way of example, but not limitation, the measurement results of the preferred report quantities meeting a certain conditions may specifically be that the difference value between the measurement results of the preferred report quantities is within a certain range, for example, less than a certain threshold, or may be other judgment conditions for indicating that the qualities of the N signals are equivalent. Optionally, the threshold may be designated by the protocol, configured by the network, or preset on the terminal device.

In this case, it can be considered that there is little difference between signal qualities of the N signals, or that the signal qualities of the N signals are similar. Therefore, the determined K signals are not necessarily the optimal K signals by selecting signals according to the measurement results of the preferred report quantities. In this case, the selection of signals combined with the measurement results of other report quantities is performed, which is conducive to improving the reliability of signal selection and further improving the system performance.

In implementation 2-2 to implementation 2-4, the selection of signals is based on two report quantities. In this case, when reporting signals, the terminal device may only report the measurement results of the preferred report quantities, or only report the measurement results of the auxiliary report quantities, or report the measurement results of the preferred report quantities and the measurement results of the auxiliary report quantities, which is not limited by this implementation of the present application.

It should be understood that the above mode of selecting signals according to the preferred report quantity and the auxiliary report quantity is only an example, and the above examples may be implemented alone or in combination, which is not limited by the implementations of the present application. Similarly, other implementations derived from the above examples also fall within the protection scope of the present application.

It should also be understood that in the implementations of the present application, each of the preferred report quantity and the auxiliary report quantity may be one or multiple, which only represent two types of report quantities, and the quantity of report quantities included in each type of report quantity is not limited.

In implementations 2-5, the terminal device may independently select and report signals according to two report quantities.

For example, the terminal device determines and reports K1 signals with optimal quality according to the measurement results of the first report quantities for N signals, and determines and reports K2 signals with optimal quality according to the measurement results of the second report quantities for the N signals.

That is to say, the network device may configure at least two report quantities through one piece of measurement configuration information, but the terminal device may independently perform measurement, the selection of signals and reporting for each report quantity.

It should be understood that K1 and K2 may be configured by the network device or determined according to K, for example, K1+K2=K, or K1 and K2 are equal and equal to K.

It should be understood that the above description only takes the selection of signals and reporting according to two report quantities as an example, which should not constitute any limitation to the implementations of the present application. Evidently, the at least one report quantity may further include more report quantities, and the terminal device may also select signals according to more report quantities. The specific implementation thereof is similar, which will not be repeatedly described here.

The signal reporting method according to an implementation of the present application is described in detail from the perspective of a terminal device above with reference to FIG. 2, and a signal reporting method according to another implementation of the present application is described in detail from the perspective of a network device below with reference to FIG. 3. It should be understood that the description of the network device side corresponds to the description of the terminal device side, and the above description may be referred to for similar descriptions, which will not be repeatedly described here.

FIG. 3 is a schematic flowchart of a signal reporting method 300 according to another implementation of the present application, and the method 300 may be executed by the network device in the communication system shown in FIG. 1. As shown in FIG. 3, the method 300 includes following contents: S310-S320.

S310, a network device sends measurement configuration information to a terminal device, wherein the measurement configuration information is used for configuring the terminal device to report related information of N signals based on at least one report quantity, wherein the at least one report quantity includes other report quantities other than the Layer1-Reference Signal Receiving Power (L1-RSRP), where N is a positive integer;

S320, the network device receives a report result sent from the terminal device, wherein the report result includes information of a signal determined by the terminal device according to the measurement results of the at least one report quantity for N signals.

Optionally, in some implementations, the other report quantities other than the L1-RSRP include a Layer1-Signal to Interference plus Noise Ratio (L1-SINR) and a Layer1-Reference Signal Receiving Quality (L1-RSRQ).

Optionally, in some implementations, the at least one report quantity further includes information related to reference signal resource identifiers.

Optionally, in some implementations, the information related to reference signal resource identifiers includes index information of a Channel State Information Reference Signal (CSI-RS) resource and/or index information of a Synchronization Signal Block (SSB).

Optionally, in some implementations, the at least one report quantity only includes a first report quantity, and the measurement configuration information further includes first indication information which is used for indicating whether the terminal device is allowed to measure second report quantities for the N signals to determine signals to be reported.

Optionally, in some implementations, the at least one report quantity only includes the first report quantity, and the measurement configuration information further includes second indication information, wherein the second indication information is used for indicating whether the measurement results of the second report quantities need to be reported.

Method implementations of the present application are described in detail above with reference to FIG. 2 to FIG. 3, apparatus implementations of the present application will be described in detail below with reference to FIG. 4 to FIG. 8. It should be understood that the apparatus implementations and the method implementations correspond to each other, and description of the method implementations may be referred to for similar description of the apparatus implementations.

FIG. 4 shows a schematic block diagram of a terminal device 400 according to an implementation of the present application. As shown in FIG. 4, the terminal device 400 includes a determination module 410.

The determination module 410 is configured to determine a target report quantity in at least one report quantity, wherein the at least one report quantity is configured by a network device through measurement configuration information, and the at least one report quantity includes other report quantities other than Layer1-Reference Signal Receiving Power (L1-RSRP); and determine signals to be reported according to measurement results of the target report quantities for N signals.

Optionally, in some implementations, the other report quantities other than the L1-RSRP include a Layer1-Signal to Interference plus Noise Ratio (L1-SINR) and a Layer1-Reference Signal Receiving Quality (L1-RSRQ).

Optionally, in some implementations, the at least one report quantity further includes information related to reference signal resource identifiers.

Optionally, in some implementations, the information related to the reference signal resource identifiers includes index information of a Channel State Information Reference Signal (CSI-RS) resource and/or index information of a Synchronization Signal Block (SSB).

Optionally, in some implementations, the determination module 410 is further used for determining, according to the measurement results of the first report quantities for the N signals, K signals with optimal signal quality as the signals to be reported, where K is a positive integer.

Optionally, in some implementations, the determination module 410 is further configured to determine K signals with optimal signal quality as the signals to be reported through a combination the measurement results of the first report quantities for the N signals and measurement results of the second report quantities for the N signals, wherein the measurement results of the second report quantities for the N signals are obtained by measuring the second report quantities of the N signals.

Optionally, in some implementations, the measurement configuration information includes first indication information, wherein the first indication information is used for indicating whether the terminal device is allowed to measure the second report quantities of the N signals to determine the signals to be reported.

Optionally, in some implementations, the measurement configuration information further includes second indication information, wherein the second indication information is used for indicating whether the measurement results of the second report quantities need to be reported.

Optionally, in some implementations, the terminal device further includes a communication module 420, which is configured to report measurement results of the first report quantities for the K signals to the network device, where K is a positive integer; or report the measurement results of the first report quantities for the K signals and the measurement results of the second report quantities for the K signals to the network device, where K is a positive integer.

Optionally, in some implementations, the at least one report quantity includes a first report quantity and a second report quantity, and the determination module 410 is further used for determining the first report quantity or the second report quantity as the target report quantity.

Optionally, in some implementations, the determination module 410 is further configured to determine, according to the measurement results of the target report quantities for the N signals, K signals with optimal signal quality as the signals to be reported, where K is a positive integer.

Optionally, in some implementations, the terminal device further includes a communication module 420, which is configured to report the measurement results of the target report quantities for the K signals to the network device; or reporting the measurement results of the target report quantities for the K signals and measurement results of other report quantities for the K signals to the network device, where K is a positive integer.

Optionally, in some implementations, the at least one report quantity includes at least a first report quantity and a second report quantity, and the determination module 410 is further used for determining the first report quantity and the second report quantity as the target report quantity.

Optionally, in some implementations, the determination module 420 is further configured to determine, according to the measurement results of the first report quantities for the N signals and the measurement results of the second report quantities for the N signals, K signals with optimal signal quality as the signals to be reported, where K is a positive integer.

Optionally, in some implementations, the first report quantity is a preferred report quantity and the second report quantity is an auxiliary report quantity. The determination module 410 is further configured to determine K signals with optimal signal quality as the signals to be reported according to the measurement results of the first report quantities for the N signals, wherein if a measurement result of the first report quantity corresponding to a first signal is the same as a measurement result of the first report quantity corresponding to a second signal, a target signal with a better quality is determined according to a measurement result of the second report quantity corresponding to the first signal and a measurement result of the second report quantity corresponding to the second signal.

Optionally, in some implementations, the first report quantity is the preferred report quantity and the second report quantity is the auxiliary report quantity, and the determination module 410 is further configured to determine M signals with optimal signal quality from the measurement results of the N first report quantities, where M is a positive integer greater than K; and determining K signals with optimal signal quality from the M signals according to the measurement results of the N second report quantities.

Optionally, in some implementations, M is configured by the network device or determined according to K.

Optionally, in some implementations, the first report quantity is the preferred report quantity and the second report quantity is the auxiliary report quantity. The determination module 410 is further configured to determine the signals to be reported according to the measurement results of the N second report quantities when the measurement results of the N first report quantities meet a specific condition.

Optionally, in some implementations, the measurement results of the N first report quantities meeting the specific condition includes that difference between the measurement results of the N report quantities is within a specific threshold.

Optionally, the specific threshold is configured through network or preset on the terminal device.

Optionally, in some implementations, the preferred report quantity and/or the auxiliary report quantity are indicated by the network device, or preset on the terminal device, or selected by the terminal device.

Optionally, in some implementations, the determination module 410 is further configured to determine the preferred report quantity and the auxiliary report quantity among the first report quantity and the second report quantity according to positions of the report quantities in the measurement configuration information; or determine the preferred report quantity and the auxiliary report quantity according to types of the first report quantity and the second report quantity.

Optionally, in some implementations, the preferred report quantity includes L1-RSRP and information related to reference signal resource identifiers, and the auxiliary report quantity includes other signal quality information other than the RSRP and information related to reference signal resource identifiers; or the auxiliary report quantity includes L1-RSRP and the information related to the reference signal resource identifiers, and the preferred report quantity includes other signal quality information other than the RSRP and the information related to the reference signal resource identifiers;

wherein the information related to the reference signal resource identifiers is index information of a CSI-RS resource; or the information related to the reference signal resource identifiers is index information of a SSB.

Optionally, the terminal device further includes a communication module 420, which is used for reporting the measurement results of the first report quantities for the K signals and/or the measurement results of the second report quantities for the K signals to the network device.

Optionally, in some implementations, the terminal device further includes a communication module 420, which is configured to inform the network device of a report quantity corresponding to the reported measurement information when only the measurement results about one report quantity are reported.

Optionally, in some implementations, the determination module 410 is further configured to determine K1 measurement results of the first report quantities according to the measurement results of the first report quantities for the N signals and determine K2 measurement results of second report quantities according to the measurement results of the second report quantities for the N signals, wherein signals corresponding to the K1 measurement results of the first report quantities and the K2 measurement results of the second report quantities are the signals to be reported, where K1 and K2 are both positive integers.

Optionally, in some implementations, the K1 and K2 are configured by the network device; or K1 and K2 are equal and equal to the quantity K of the signals to be reported which is configured through network.

Optionally, in some implementations, the terminal device further includes a measurement module, which is used for measuring the target report quantities of the N signals to obtain the measurement results of the target report quantities for the N signals.

Specifically, the terminal device 400 may correspond to (e.g., may be configured in or be itself) the terminal device described in the above method 200, and various modules or units in the terminal device 400 are respectively used for executing various actions or processing procedures executed by the terminal device in the above method 200. Herein, in order to avoid redundancy, detailed description thereof is omitted.

FIG. 5 is a schematic block diagram of a network device according to an implementation of the present application. The network device 500 in FIG. 5 includes:

a communication module 510, which is configured to send measurement configuration information to a terminal device, wherein the measurement configuration information is used for configuring the terminal device to report related information of N signals based on at least one report quantity, wherein the at least one report quantity includes other report quantities other than Layer1-Reference Signal Receiving Power (L1-RSRP), where N is a positive integer; and receive a report result sent from the terminal device, wherein the report result includes information of a signal determined by the terminal device according to the measurement results of the at least one report quantity for the N signals.

Optionally, in some implementations, the other report quantities other than the L1-RSRP include a Layer1-Signal to Interference plus Noise Ratio (L1-SINR) and a Layer1-Reference Signal Receiving Quality (L1-RSRQ).

Optionally, the at least one report quantity further includes information related to reference signal resource identifiers.

Optionally, in some implementations, the information related to the reference signal resource identifiers includes index information of a Channel State Information Reference Signal (CSI-RS) resource and/or index information of a Synchronization Signal Block (SSB).

Optionally, in some implementations, the at least one report quantity only includes a first report quantity, and the measurement configuration information further includes first indication information which is used for indicating whether the terminal device is allowed to measure second report quantities of the N signals to determine signals to be reported.

Optionally, the at least one report quantity only includes the first report quantity, and the measurement configuration information further includes second indication information, wherein the second indication information is used for indicating whether the measurement results of the second report quantities need to be reported.

Specifically, the network device 500 may correspond to (e.g., may be configured in or be itself) the network device described in the above method 300, and various modules or units in the network device 500 are respectively used for executing various actions or processing procedures executed by the network device in the method 300. Herein, in order to avoid redundancy, detailed description thereof is omitted.

FIG. 6 is a schematic structural diagram of a communication device 600 provided by an implementation of the present application. The communication device 600 shown in FIG. 6 includes a processor 610. The processor 610 may call and run a computer program from a memory to implement the method in an implementation of the present application.

Optionally, as shown in FIG. 6, the terminal device 600 may further include a memory 620. In the above, the processor 610 may call and run a computer program from the memory 620 to implement the method in an implementation of the present application.

In the above, the memory 620 may be a separate device independent of the processor 610 or may be integrated in the processor 610.

Optionally, as shown in FIG. 6, the communication device 600 may further include a transceiver 630, and the processor 610 may control the transceiver 630 to communicate with other devices. Specifically, the transceiver may send information or data to other devices or receive information or data sent from other devices.

In the above, the transceiver 630 may include a transmitter and a receiver. The transceiver 630 may further include antennas, and the number of the antennas may be one or more.

Optionally, the communication device 600 may specifically be a network device of an implementation of the present application, and the communication device 600 may implement the corresponding processes implemented by a network device in various methods of the implementations of the present application, which will not be repeated here for sake of brevity.

Optionally, the communication device 600 may specifically be a mobile terminal/terminal device of an implementation of the present application, and the communication device 600 may implement the corresponding processes implemented by the mobile terminal/terminal device in various methods of the implementations of the present application, which will not be repeated here for sake of brevity.

Figure 7:
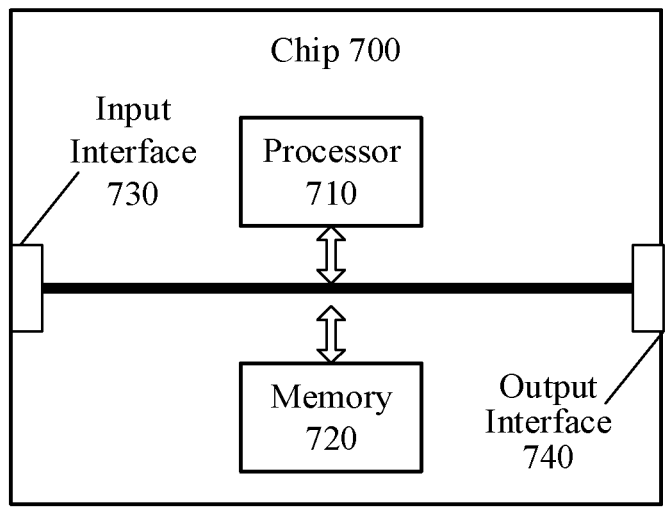
FIG. 7 is a schematic block diagram of a chip provided by an implementation of the present application.

FIG. 7 is a schematic structural diagram of a chip of an implementation of the present application. The chip 700 shown in FIG. 7 includes a processor 710. The processor 710 may call and run a computer program from a memory to implement the method in an implementation of the present application.

Optionally, as shown in FIG. 7, the chip 700 may further include a memory 720. In the above, the processor 710 may call and run a computer program from the memory 720 to implement the method in an implementation of the present application.

In the above, the memory 720 may be a separate device independent of the processor 710 or may be integrated in the processor 710.

Optionally, the chip 700 may further include an input interface 730. In the above, the processor 710 may control the input interface 730 to communicate with other devices or chips. Specifically, the processor may acquire information or data sent from other devices or chips.

Optionally, the chip 700 may further include an output interface 740. In the above, the processor 710 may control the output interface 740 to communicate with other devices or chips. Specifically, the processor may output information or data to other devices or chips.

Optionally, the chip may be applied to a network device in an implementation of the present application, and the chip may implement the corresponding processes implemented by the network device in various methods of the implementations of the present application, which will not be repeated here for sake of brevity.

Optionally, the chip may be applied to a mobile terminal/terminal device in an implementation of the present application, and the chip may implement the corresponding processes implemented by the mobile terminal/terminal device in the various methods of the implementations of the present application, which will not be repeated here for sake of brevity.

It should be understood that the chip mentioned in the implementations of the present application may be referred to as a system-level chip, a system chip, a chip system or a system-on-chip, etc.

Figure 8:
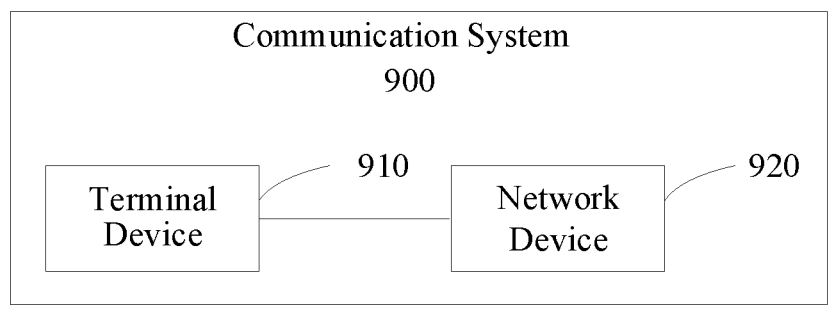
FIG. 8 is a schematic block diagram of a communication system provided by an implementation of the present application.

FIG. 8 is a schematic block diagram of a communication system 900 provided by an implementation of the present application. As shown in FIG. 8, the communication system 900 may include a terminal device 910 and a network device 920.

In the above, the terminal device 910 may be used for implementing the corresponding functions implemented by the terminal device in the above-mentioned method, and the network device 920 may be used for implementing the corresponding functions implemented by the network device in the above-mentioned method, which will not be repeated here for sake of brevity.

It should be understood that, the processor in this implementation of the present application may be an integrated circuit chip having a signal processing capability. In an implementation process, the acts of the foregoing method implementations may be implemented by using an integrated logic circuit of hardware in the processor or instructions in a form of software. The processor may be a general purpose processor, a digital signal processor (Digital Signal Processing, DSP), an application specific integrated circuit (Application Specific Integrated Circuit, ASIC), a field programmable gate array (Field Programmable Gate Array, FPGA) or another programmable logic device, a discrete gate or a transistor logic device, or a discrete hardware component. The processor may implement or perform methods, acts and logical block diagrams disclosed in this implementation of the present application. The general purpose processor may be a microprocessor, or the processor may be any conventional processor or the like. The acts of the method disclosed with reference to this implementation of the present application may be directly implemented by a hardware decoding processor, or may be implemented by a combination of hardware and software modules in the decoding processor. The software modules may be located in a storage medium commonly used in the art, such as a random access memory, a flash memory, a read-only memory, a programmable read-only memory or an electrically erasable programmable memory, or a register. The storage medium is located in the memory, and the processor reads the information in the memory and completes the acts of the above method in combination with its hardware.

It may be understood that, the memory in this implementation of the present application may be a transitory memory or a non-transitory memory, or may include both a transitory memory and a non-transitory memory. The non-transitory memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The transitory memory may be a random access memory (Random Access Memory, RAM), and is used as an external cache. Through exemplary but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM), and a direct rambus dynamic random access memory (Direct Rambus RAM, DR RAM). It should be noted that the memory in the systems and methods described in this specification is aimed at including but being not limited to these and any memory of another proper type.

It should be understood that, the foregoing memory is an example for illustration and should not be construed as limiting. For example, optionally, the memory in the implementations of the present application may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Direct Rambus RAM (DR RAM), or the like. That is, memories in the implementations of the present application are intended to include, but are not limited to, these and any other suitable types of memories.

An implementation of the present application further provides a computer readable storage medium used for storing a computer program.

Optionally, the computer readable storage medium may be applied to a network device in an implementation of the present application, and the computer program enables a computer to execute the corresponding processes implemented by a network device in various methods of the implementations of the present application, which will not be repeated here for sake of brevity.

Optionally, the computer readable storage medium may be applied to a mobile terminal/terminal device in an implementation of the present application, and the computer program enables a computer to execute the corresponding processes implemented by the mobile terminal/terminal device in various methods of the implementations of the present application, which will not be repeated here for sake of brevity.

An implementation of the present application further provides a computer program product including computer program instructions.

Optionally, the computer program product may be applied to a network device in an implementation of the present application, and the computer program instructions enable a computer to execute the corresponding processes implemented by the network device in various methods of the implementations of the present application, which will not be repeated here for sake of brevity.

Optionally, the computer program product may be applied to a mobile terminal/terminal device in the implementation of the present application, and the computer program instructions enable a computer to execute the corresponding processes implemented by the mobile terminal/terminal device in various methods of the implementation of the present application, which will not be repeated here for sake of brevity.

An implementation of the present application further provides a computer program.

Optionally, the computer program may be applied to a network device in an implementation of the present application. When the computer program is run on a computer, the computer is enabled to execute the corresponding processes implemented by the network device in various methods of the implementations of the present application, which will not be repeated here for sake of brevity.

Optionally, the computer program may be applied to a mobile terminal/terminal device in an implementation of the present application. When the computer program is run on a computer, the computer is enabled to execute the corresponding processes implemented by the mobile terminal/terminal device in various methods of the implementations of the present application, which will not be repeated here for sake of brevity.

Those of ordinary skill in the art will recognize that the exemplary elements and algorithm acts described in combination with the implementations disclosed herein may be implemented in electronic hardware, or a combination of computer software and electronic hardware. Whether these functions are implemented in hardware or software depends on the specific application and design constraints of the technical solution. Skilled artisans may use different methods to implement the described functions in respect to each particular application, but such implementation should not be considered to be beyond the scope of the present application.

Those skilled in the art may clearly understand that for convenience and conciseness of description, the specific working processes of the systems, apparatuses and units described above may refer to the corresponding processes in the method implementations and will not be described here.

In several implementations provided by the present application, it should be understood that the disclosed systems, apparatuses and methods may be implemented in other ways. For example, the apparatus implementations described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the implementations.

In addition, various functional units in various implementations of the present application may be integrated in one processing unit, or the various units may be physically present separately, or two or more units may be integrated in one unit.

The functions may be stored in a computer readable storage medium if realized in a form of software functional units and sold or used as a separate product. Based on this understanding, the technical solution of the present application, in essence, or the part contributing to the prior art, or the part of the technical solution, may be embodied in the form of a software product stored in a storage medium, including a number of instructions for causing a computer device (which may be a personal computer, a server, or a network device and the like) to perform all or part of the acts of the method described in various implementations of the present application.

The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

What are described above are merely exemplary implementations of the present application, but the protection scope of the present application is not limited thereto. Any variation or substitution that may be easily conceived by a person skilled in the art within the technical scope disclosed by the present application shall be included within the protection scope of the present application. Therefore, the protection scope of the present application shall be determined by the protection scope of the claims.

What is claimed is:

1. A method for reporting a signal, comprising:
   determining, by a terminal device, a target report quantity in at least one report quantity, wherein the at least one report quantity is indicated in measurement configuration information sent by a network device, and the at least one report quantity comprises a Layer1-Signal to Interference plus Noise Ratio (L1-SINR); and
   determining, by the terminal device, signals to be reported according to a measurement result of the target report quantity for each of N signals;
   wherein the at least one report quantity only comprises a first report quantity, and the determining by a terminal device, a target report quantity in at least one report quantity comprises: determining, by the terminal device, the first report quantity as the target report quantity; or the at least one report quantity comprises a first report quantity and a second report quantity, and the determining, by a terminal device, a target report quantity in at least one report quantity comprises: determining, by the terminal device, the first report quantity or the second report quantity as the target report quantity;
   wherein the method further comprises:
   determining, by the terminal device, signals to be reported according to a measurement result of a third report quantity for each of N signals; wherein the third report quantity is indicated in second measurement configuration information sent by the network device;
   wherein the determining signals to be reported according to the measurement result of the target report quantity for each of N signals is independent of the determining signals to be reported according to the measurement result of the third report quantity for each of N signals.

2. The method of claim 1, wherein the at least one report quantity further comprises information related to reference signal resource identifiers,
   wherein the information related to the reference signal resource identifiers comprise index information of a Channel State Information Reference Signal (CSI-RS) resource and/or index information of a Synchronization Signal Block (SSB).

3. The method of claim 1, wherein the determining by the terminal device signals to be reported according to a measurement result of the target report quantity for each of N signals comprises:
   determining, by the terminal device, K best quality signals as the signals to be reported according to the measurement results of the target report quantity for each of the N signals, where K is a positive integer.

4. The method of claim 3, wherein the at least one report quantity comprises the first report quantity and the second report quantity, the method further comprises:
   reporting, by the terminal device, a measurement result of the target report quantity for each of the K signals to the network device; or
   reporting, by the terminal device, a measurement result of the target report quantity for each of the K signals and a measurement result of the other report quantity for each of the K signals to the network device, where K is a positive integer.

5. A terminal device, comprising:
   a processor configured to determine a target report quantity in at least one report quantity, wherein the at least one report quantity is indicated in measurement configuration information sent by a network device, and the at least one report quantity comprises a Layer1-Signal to Interference plus Noise Ratio (L1-SINR); and
   determine a signal to be reported according to a measurement results of the target report quantity for each of N signals;
   wherein the at least one report quantity only comprises a first report quantity, and the determining by a terminal device, a target report quantity in at least one report quantity comprises: determining, by the terminal device, the first report quantity as the target report quantity; or the at least one report quantity comprises a first report quantity and a second report quantity, and the determining, by a terminal device, a target report quantity in at least one report quantity comprises: determining, by the terminal device, the first report quantity or the second report quantity as the target report quantity;
   the processor is further configured to determine signals to be reported according to a measurement result of a third report quantity for each of N signals; wherein the third report quantity is indicated in second measurement configuration information sent by the network device;
   wherein determination of signals to be reported according to the measurement result of the target report quantity for each of N signals is independent of determination of signals to be reported according to the measurement result of the third report quantity for each of N signals.

6. The terminal device of claim 5, wherein the at least one report quantity further comprises information related to reference signal resource identifiers;
   wherein the information related to the reference signal resource identifiers comprises index information of a Channel State Information Reference Signal (CSI-RS) resource and/or index information of a Synchronization Signal Block (SSB).

7. The terminal device of claim 5, wherein the processor is further configured to determine, according to the measurement result of the target report quantity for each of the N signals, K best quality signals as signals to be reported, where K is a positive integer.

8. The terminal device of claim 5, wherein the at least one report quantity comprises the first report quantity and the second report quantity, the terminal device further comprises:
   a transceiver configured to report a measurement result of the target report quantity for each of the K signals to the network device; or report a measurement result of the target report quantity for each of the K signals and a measurement result of the other report quantity for each of the K signals to the network device, where K is a positive integer.

9. A method for reporting a signal, comprising:

sending, by a network device, measurement configuration information to a terminal device, wherein the measurement configuration information is configured to configure the terminal device to determine a target report quantity in at least one report quantity and report related information of N signals based on the target report quantity, and the at least one report quantity is indicated in the measurement configuration information, the at least one report quantity comprises a Layer1-Signal to Interference plus Noise Ratio (L1-SINR), where N is a positive integer; and receiving, by the network device, a report result sent from the terminal device, wherein the report result comprises information of signals determined by the terminal device according to a measurement result of the target report quantity for each of the N signals;

wherein the at least one report quantity only comprises a first report quantity, the first report quantity is determined as the target report quantity; or the at least one report quantity comprises a first report quantity and a second report quantity, the first report quantity or the second report quantity is determined as the target report quantity;

wherein the method further comprises:

sending, by the network device, second measurement configuration information to the terminal device, wherein the second measurement configuration information is configured to configure the terminal device to report related information of N signals based on a third report quantity; and receiving, by the network device, a report result sent from the terminal device, wherein the report result comprises information of signals determined by the terminal device according to a measurement result of the third report quantity for each of the N signals;

wherein the report result comprising information of signals determined by the terminal device according to the measurement result of the target report quantity for each of the N signals is independent of the report result comprising information of signals determined by the terminal device according to the measurement result of the third report quantity for each of the N signals.

10. The method of claim 9, wherein the at least one report quantity further comprises information related to reference signal resource identifiers;

the information related to the reference signal resource identifiers comprises index information of a Channel State Information Reference Signal (CSI-RS) resource and/or index information of a Synchronization Signal Block (SSB).

11. A network device, comprising a processor and a memory, wherein the memory is configured to store a computer program and the processor is configured to call and execute the computer program stored in the memory to execute the method of claim 9.

* * * * *